Sept. 4, 1962 W. R. STEPHEN 3,052,416
EVAPORATOR PLATES
Filed Jan. 25, 1961
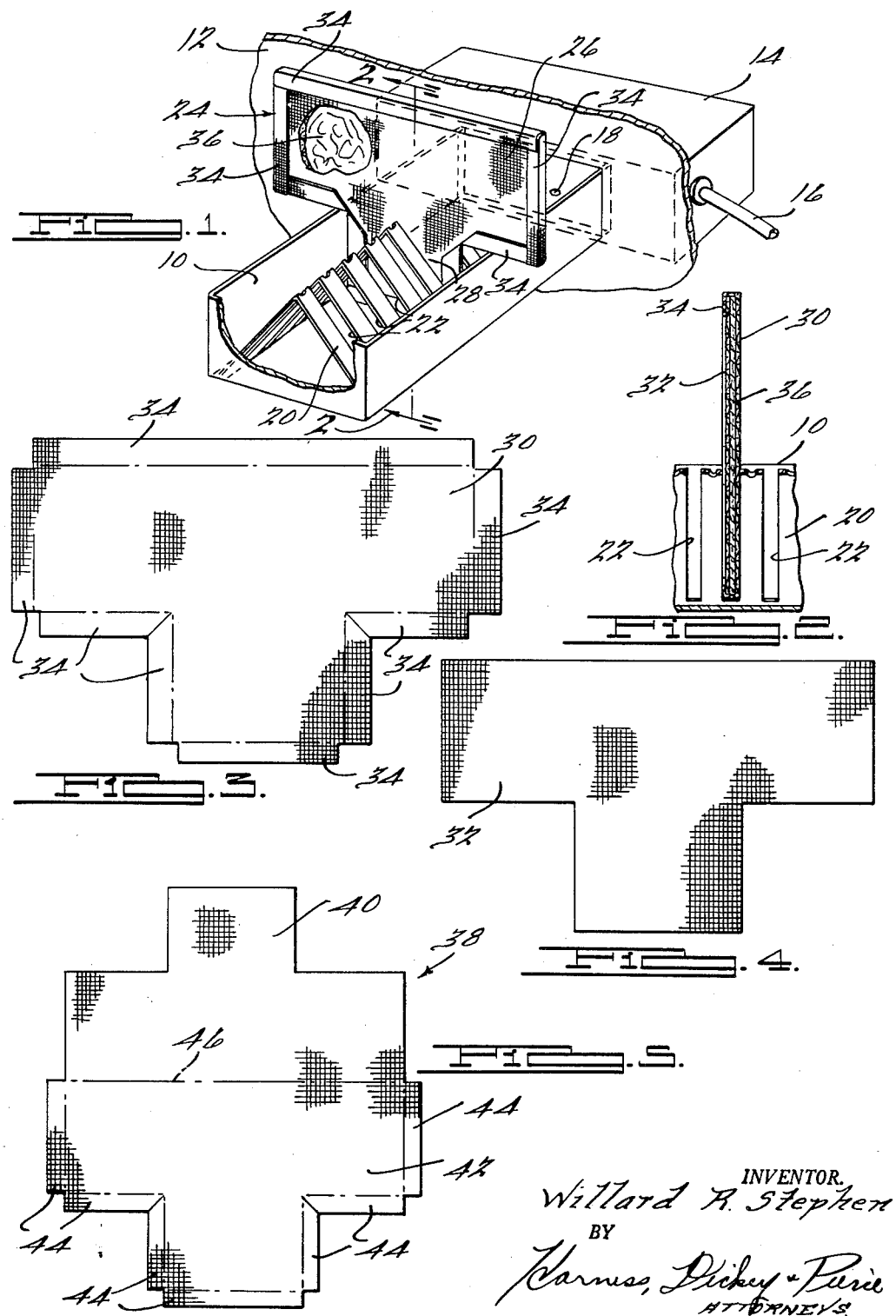
INVENTOR.
Willard R. Stephen
BY
Harness, Dickey & Pierce
ATTORNEYS

United States Patent Office 3,052,416
Patented Sept. 4, 1962

3,052,416
EVAPORATOR PLATES
Willard R. Stephen, Lake Orion, Mich., assignor of fifty percent to Marcus L. Freud, Lake Orion, Mich.
Filed Jan. 25, 1961, Ser. No. 84,945
2 Claims. (Cl. 239—44)

The present invention relates generally to humidifiers or evaporators, and more particularly to improved evaporator plates therefor.

For exemplary purposes, humidifiers of the type used in hot air heating systems will be discussed. Generally, humidifiers of this type comprise an open evaporator tray positioned within one of the hot air ducts of the heating system near the furnace. A constant level reservoir is positioned outside the duct which communicates with the evaporator tray to maintain a constant level of water therein. To maximize the free surface of the water, so as to achieve maximum evaporation efficiency, a plurality of vertically extending heat resistant evaporator plates are disposed within the tray in contact with the water therein. These evaporator plates are usually formed of a pressed absorbent material which absorbs water from the evaporator tray and holds it in the flow of hot air so that evaporation may take place, to thereby increase the humidity of the air.

Evaporator plates such as those described above usually comprise nothing more than a plate of fibrous asbestos absorbent, including silica, magnesium oxide, water, ferrous and ferric oxide, aluminum oxide and calcium oxide, this fibrous mass being highly pressed or compressed into a relatively dense and rigid structure having sufficient strength to stand upright without reinforcement.

It is therefore a primary object of this invention to provide a novel improved evaporator plate of simple and inexpensive construction which may be used in all applications where the aforementioned plates are presently used without modifying any of the associated humidifier apparatus, which may be formed using substantially the same readily available heat resistant absorbent, but which does not rely upon the pressed absorbent for strength, whereby the absorbent may be used in a much more loosely compacted and less dense form having substantially greater absorption qualities than when in the pressed form, primarily due to the increased amount of air space between the fibers or particles thereof through which capillary action may take place.

A further object of this invention resides in the provision of a unique evaporator plate which gains its structural strength from the provision of reinforcing heat conductive screening, whereby compression of the absorbent, with the attendant loss of absorption efficiency is not required; and wherein the heat conductive screening tends to maintain the entire plate at a uniform temperature, to thereby increase evaporation efficiency.

Yet another object thereof resides in the provision of a novel evaporator plate comprising a mass of loosely compacted fibrous asbestos material maintained in plate form by a pair of substantially parallel spaced reinforcing screens on each side thereof, which evaporator plate is relatively flexible compared to the aforementioned conventional tightly compressed plates, whereby it has greater resistance to breakage, and a greatly reduced tendency to distort in the presence of heat and moisture. A related object is the provision of an evaporator plate of this type which may be readily rejuvenated by simply flexing the plate to loosen the absorbent material thereof.

These and other objects of the present invention will become apparent from consideration of the present specification taken in conjunction with the accompanying drawings, in which there are shown two embodiments of the invention by way of example, and wherein:

FIGURE 1 is a perspective view, partly in section, of a humidifier unit provided with evaporator plates embodying the principles of the present invention;

FIGURE 2 is a sectional view taken along line 2—2 in FIGURE 1;

FIGURES 3 and 4 are side elevational views illustrating one form which the reinforcing screening may take prior to the assembly of a finished evaporator plate; and FIGURE 5 is a modified form thereof.

Referring to FIGURE 1, there is shown a conventional humidifier unit comprising an evaporator tray 10 extending within a hot air duct, one portion of the side wall of which is indicated at 12, and communicating outside the duct with a constant level reservoir 14, to which water is supplied through a suitable conduit 16. Constant level reservoir 14 does not form a part of the present invention and may be provided with any suitable float means or the like for maintaining a constant level of water therein. Communication between reservoir 14 and evaporator tray 10 may be through an orifice 18 in the end wall of the evaporator tray. Positioned within evaporator tray 10 is an angular rack 20 having a plurality of transversely extending slots 22 therein for supporting in a vertical plane a plurality of evaporator plates, generally indicated at 24. The number of plates used at any one time will be dictated by the amount of humidification or evaporation desired, only one being shown.

As can be seen, evaporator plates 24 are generally T-shaped in configuration, comprising a main body portion 26 and a downwardly extending projection 28. In actual use, projection 28 of each plate will extend below the level of water in evaporator tray 10 and will serve to conduct this water by capillary action up into and throughout the remainder of the plate, whereby such water may evaporate from the entire area of both surfaces of each evaporator plate used. Of course, any size and shape plates may be used and they may be mounted in any desired way, so long as a portion thereof is in contact with a source of water.

In one embodiment, evaporator plates according to the present invention may be formed using a pair of pre-cut screens 30 and 32, illustrated in FIGURES 3 and 4 respectively. These screens may be cut to the shape illustrated by suitable dies or the like, and are preferably formed from copper screening so that the heat conducting properties of copper may be utilized. However, any suitable screening material preferably having the desired heat conduction properties may be used. Screen 32 is formed to a shape corresponding to the final shape of the evaporator plate. Screen 30 is of a similar shape, but is provided with a plurality of bendable tabs 34 about the periphery thereof.

The evaporator plate is assembled by depositing a loosely mixed or compacted mass of fibrous asbestos 36, such as that described above, in a fairly uniformly thick layer on one of the screens, and then placing the other screen thereon. The bendable tabs 34 on screen 30 are then mechanically folded across the thickness of the asbestos mass 36 and over and back against the outside surface of screen 32 to secure the evaporator plate together. The resulting assembled plate is clearly shown in FIGURE 1.

In FIGURE 5 there is illustrated a modified shape screen 38 which may be used in place of screens 30 and 32. As can be seen, screen 38 is a single-piece reinforcing screen, and comprises a first portion 40 similar in shape to screen 32, and a second portion 42 similar in shape to screen 30, the latter portion being provided with a plurality of bendable tabs 44 about the periphery thereof. As can be easily visualized, an evaporator plate is formed by depositing on one portion of screen 38 a uniformly thick layer of loosely mixed or compacted fibrous asbestos material 36, and then folding or bending the entire screen 38 about a central fold line 46 until portions 40 and 42 are substantially parallel to each other, whereupon tabs 44 may be folded over and back against the outside face of portion 40 to secure the resulting evaporator plate together. In both embodiments the assembled plate is held together mechanically simply by the folded tabs, no other fastening means being necessary.

It is important to note that the aforementioned advantages of the present invention are inexpensively achieved by providing an evaporator plate wherein the absorbent is not relied upon for strength, so that it may be used in a form which will yield the most desirable absorption characteristics. In this regard, the specific absorbent material used may be of any suitable composition, such as fibrous asbestos or the like, and it may be mixed and applied in the ordinary manner, utilizing techniques and equipment conventional in the art. When used in heating systems the absorbent material should be heat resistant, i.e. not combustible or inflammable at the temperatures which will be encountered. The size mesh screening used will depend upon the properties of the absorbent used, such as its grain or fiber size, weight, and so on. For example, window type screening has been found to be satisfactory with certain fibrous asbestos compositions. In any case, the screening should be strong enough to support itself upright when the absorbent is saturated, and yet of such a mesh size as to maximize the exposed area of the absorbent.

While the present invention is described with reference to a heating system, it is not limited thereto since the present evaporator plates may be used in any evaporator using evaporator plates, such as those used in air cooling systems. In any case, the heat conductivity of the screening will serve to create a uniform temperature across the faces of the plate to maximize the evaporation properties thereof. The evaporation of fluids other than water may also be readily effected by evaporation plates of the present invention, so long as suitable absorbent materials are used.

Thus, there are disclosed in the above description and in the drawings several exemplary embodiments of the present invention which fully and effectively accomplish the objects thereof. However, it will be apparent that variations in the details of the construction may be indulged in without departing from the sphere of the invention as herein described or the scope of the appended claims.

What is claimed is:

1. An improved evaporator plate comprising: a single flexible screen having a shape substantially symmetrical about one axis thereof, said screen being folded back upon itself along said axis to define two substantially parallel slightly spaced opposed portions; a plurality of tabs integrally formed about the periphery of one of said portions, said tabs extending towards and engaging the periphery of the other of said portions to enclose the space between said portions; and a mass of loosely compacted absorbent material disposed between and supported by said opposed portions.

2. An improved evaporator plate comprising: a single flexible heat conductive screen having a shape substantially symmetrical about one axis thereof, said screen being folded back upon itself along said axis to define two substantially parallel slightly spaced opposed portions; a plurality of tabs integrally formed about the periphery of one of said portions, said tabs extending towards and engaging the periphery of the other of said portions to enclose the space between said portions; and a mass of loosely compacted absorbent material disposed between and supported by said opposed portions.

References Cited in the file of this patent

UNITED STATES PATENTS

| | | |
|---|---|---|
| 1,790,993 | Matteson | Feb. 3, 1931 |
| 1,841,889 | Grunwald | Jan. 19, 1932 |
| 1,863,511 | Travis | June 14, 1932 |
| 2,904,258 | Miller | Sept. 15, 1959 |

FOREIGN PATENTS

| | | |
|---|---|---|
| 279,605 | Great Britain | Nov. 3, 1927 |